United States Patent [19]

Uchida

[11] Patent Number: 4,675,806
[45] Date of Patent: Jun. 23, 1987

[54] DATA PROCESSING UNIT UTILIZING DATA FLOW ORDERED EXECUTION

[75] Inventor: Keiichiro Uchida, Yokohama, Japan

[73] Assignee: Fujitsu Limited, Kawasaki, Japan

[21] Appl. No.: 471,524

[22] Filed: Mar. 2, 1983

[30] Foreign Application Priority Data

Mar. 3, 1982 [JP] Japan ................................. 57-33435

[51] Int. Cl.[4] .............................................. G06F 9/34
[52] U.S. Cl. ............................................ 364/200
[58] Field of Search ... 364/200 MS File, 900 MS File

[56] References Cited

U.S. PATENT DOCUMENTS

| | | | |
|---|---|---|---|
| 3,766,527 | 10/1973 | Briley | 364/200 |
| 3,949,379 | 4/1976 | Ball | 364/200 |
| 3,962,706 | 6/1976 | Dennis et al. | 364/900 |
| 4,075,688 | 2/1978 | Lynch, Jr. et al. | 364/200 |
| 4,153,941 | 5/1979 | Caddell | 364/900 |
| 4,168,523 | 9/1979 | Chari et al. | 364/200 |
| 4,366,536 | 12/1982 | Kohn | 364/200 |

*Primary Examiner*—Thomas M. Heckler
*Attorney, Agent, or Firm*—Staas & Halsey

[57] ABSTRACT

In an information processing unit, in particular, in a data flow type information processing unit, an instruction indicates whether operand data for use by this instruction is available. Operand data, both from external storage units and from previously executed instructions, are stored in a data memory while instructions are stored in an instruction memory. An instruction execution unit is started by a control signal when all operands necessary for executing an instruction are available. Instructions and data can be routed independently, thereby permitting more rapid execution of instructions.

11 Claims, 9 Drawing Figures

DATA PROCESSING UNIT UTILIZING DATA FLOW ORDERED EXECUTION

BACKGROUND OF THE INVENTION

1. Field of the Invention

The present invention relates to an information processing unit and, more particularly, to a data flow type of information processing unit in which an input field of an instruction being processed by the unit is given information indicating whether the operand data to be used by the instruction is available. Operand data is tranferred independently of, but as specified by instructions.

2. Description of the Prior Art

In a Von Neumann type information processing unit, the execution of an instruction is under what is called sequential control. However, in the data flow type of information processing unit, an instruction can be executed when data necessary therefor is available and the sequence of the execution of instructions can be freely determined by the hardware. In addition, a plurality of instructions can be executed in parallel. Therefore, the data flow type information processing unit is, for example, well suited for the implementation of a vector processor which executes vector instructions in parallel.

However, the application of the configuration of the conventional data flow type information processing unit to an information processing unit for scientific computations encounters various problems. One of the major problems is that in the prior art data flow type of information processing unit, an instruction and its data (values) are mixed into one packet or block for transfer. Because of this, in the conventional data flow type of information processing unit, a hardware circuit for moving an instruction and a circuit for transferring data cannot be separated, which offsets one of the advantages that break what is called the Von Neumann bottleneck.

SUMMARY OF THE INVENTION

It is an object of the present invention to provide an information processing unit which performs instruction processing on the basis of the dependence of an instruction on data and in which the paths of instructions and data are separated and data is transferred as directed and required by instructions.

Another object of the present invention is to provide an information processing unit in which the desired instruction is determined on the basis of a proper sequence and a register number assigning processor automatically assigns to the instruction a register in which to place the processing result, and the software is required only to provide data flow control.

Another object of the present invention is to provide an information processing unit in which register numbers are prepared corresponding to instructions, thereby permitting identification of data.

Yet another object of the present invention is to provide an information processing unit in which, when an instruction is issued to an operation unit, the contents of an input field of the instruction are cleared to make it inactive, indicating that the instruction may be utilized as the next instruction.

According to the present invention, in an information processing unit of the type that makes an instruction executable on the basis of the determination that operand data necessary for executing the instruction is or will be available and properly executes the instruction by hardware, the instruction used has: an operation code field; an input field having a sufficient number of bits to indicate whether the operand data to be used by the instruction is active or inactive; and a destination field for specifying an input field of an instruction to be linked with this instruction. When a first instruction designating a second instruction in the first instruction's destination field, is executed, an indication that operand data is active is placed in the input field of the second instruction. The processing unit is provided with an instruction memory for storing instructions, an instruction fetch unit for fetching an executable instruction from the instruction memory, and an operation unit for loading desired operand data from a data memory to execute the fetched instructions in parallel.

DESCRIPTION OF THE PREFERRED EMBODIMENTS

Figure 1A:
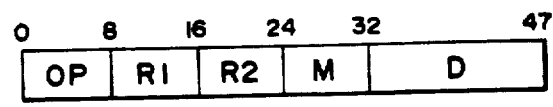
FIGS. 1A and 1B are diagrams of examples of instruction formats for use in the present invention.

In the present invention, instructions related to operations have an instruction format such as the one illustrated in FIG. 1A, comprising: an instruction code field (OP), two input fields ($R_1$, $R_2$), and a destination field (D). On the other hand, instructions related to control, such as copy, switch and union, have an instruction format such as the one illustrated in FIG. 1B, comprising: an instruction code field (OP), an input field ($R_1$), and two destination fields ($D_1$, $D_2$). There may be three or more input fields or destination fields, not always one or two.

Figure 2A:
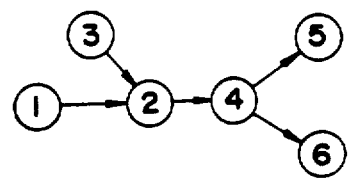
FIGS. 2A and 2B are diagrams of a linkage of instructions according to the present invention.
Figure 2B:
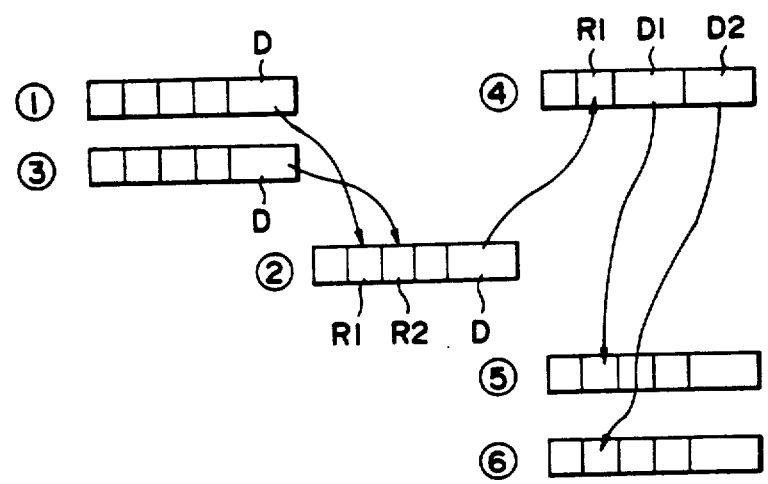

As an example of the operation of the present invention, assume that an instruction control linkage like that in FIG. 2A is to be executed. Instructions ① and ③ are first executed to make an instruction ② executable, and then an instruction ④ is executed to make instructions ⑤ and ⑥ executable. The contents of the destination field of one instruction determines its linkage with the input field of the instruction to be executed next, as illustrated in FIG. 2B. In the example, having determined that operand data is or will be available as a result of the execution of instruction ①, a certain value is put into the input field $R_1$ of instruction ② which is specified by the destination field D of instruction ①. This value indicates that one of the operand data to be used by instruction ② is available. Similarly, having determined that operand data is or will be available as a result of the execution of instruction ③ a certain value is put into the input field $R_2$ of instruction ② which is specified by the destination field D of instruction ③. This value indicates that another one of the operand data to be used by instruction ②is available. Upon completion of the execution of instruction ②, a certain value is put into the input field R₁ of instruction ④ which is specified by the destination field D of instruction ②. This value indicates that instruction ④ has become executable. Likewise, by completion of the execution of instruction ④, values are put into the input fields of instructions ⑤ and ⑥ which are specified by the destination fields D₁ and D₂ of instruction ④, whereby instruction ④ is linked with instructions ⑤ and ⑥.

Figure 1B:
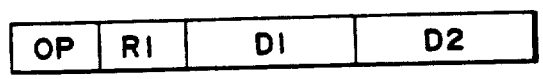

In the case of the present invention, it is sufficient, theoretically, that the input field illustrated in FIGS. 1A and 1B is a 1-bit field (to be used for indicating that the operand data is available). However, it is preferable that the input field have an 8-bit field length, as illustrated in FIGS. 1A and 1B, to permit writing therein the number of the register in which the operand data is being stored. Thereby, one field indicates that the operand data is available and provides the register number where the data is located.

The instructions for use in the present invention are: (i) arithmetic operations, such as ADD, MULTIPLY, DIVIDE and so forth; (ii) ordinary instructions, such as COMPARE, LOGICAL, SHIFT, MASKLOGICAL, LOAD, STORE and so forth; (iii) control instructions, such as COPY, SWITCH, UNION and so forth; (iv) function link instructions, such as APPLY and so on; and (v) interface instructions for external units, such as an input/output unit. It is also possible that these instructions are provided both as vector instructions and as scalar instructions, if necessary.

Figure 3:
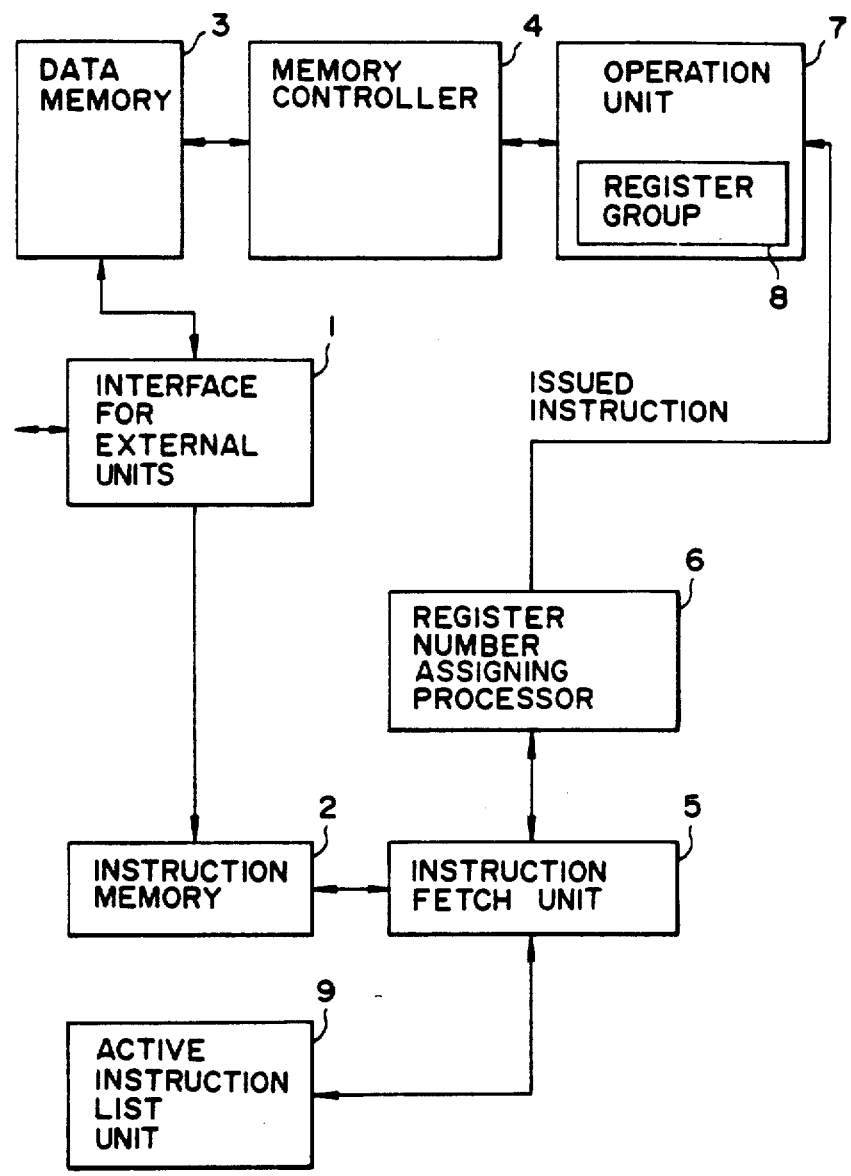
FIG. 3 is a block diagram illustrating the hardware arrangement of an embodiment of the present invention.

FIG. 3 illustrates the hardware structure of an embodiment of the present invention. In FIG. 3, reference numeral 1 indicates an interface for an external unit; 2 designates an instruction memory having stored therein instructions having a format as illustrated in FIGS. 1A and 1B; and 3 identifies a data memory having stored therein operand data. Reference numeral 4 denotes a memory controller which performs the process of accessing the data memory 3 to load desired operand data in the register specified by the contents of the input fields R₁ and R₂ and storing operation results in the data memory 3. Reference numeral 5 represents an instruction fetch unit which checks whether instructions read from the instruction memory 2 are executable and fetches executable instructions; and 6 indicates a register number assigning processor. When the resources to be used by an executable instruction, such as an add unit, a register and so forth, are available, it is determined to issue the instruction. At the same time, the number of a register for storing a destination operand of the instruction is assigned and hardware performs automatic assignment processing. the assigned register number is provided to the instruction fetch unit, which writes the register number into the input field of another instruction specified by the destination field of the first-mentioned instruction. Reference numeral 7 refers to an operation unit, including one or more operators which execute a desired operation; 8 signifies a register group; and 9 indicates an active instruction list unit in which executable instructions are queued awaiting execution. The data memory and instruction memory may physically be the same memory.

Figure 4:
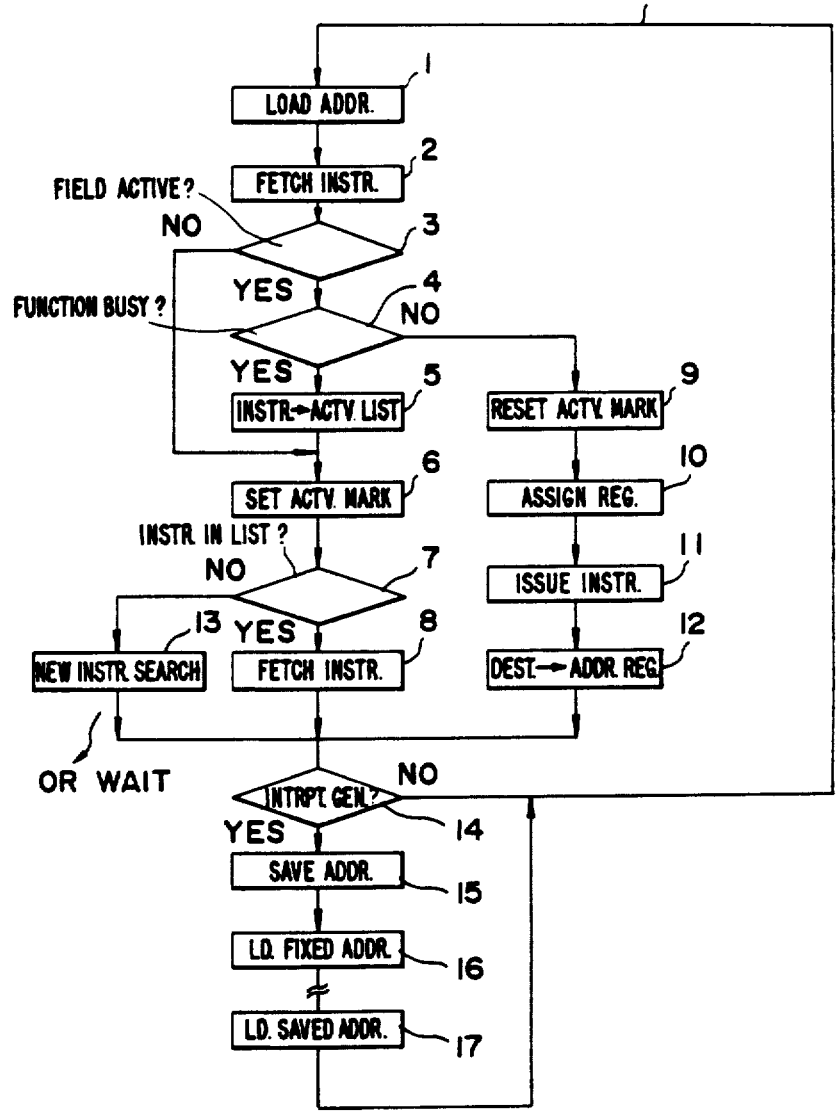
FIG. 4 is a flowchart of an instruction processing operation in the embodiment of the present invention illustrated in FIG. 3.

A description will be given, with reference to the flowchart of FIG. 4, of the operation of the embodiment illustrated in FIG. 3. In the following description, labels and numerals enclosd by parentheses will be used to indicate blocks in the flowchart.

The interface for the external units 1 has interfaces for a central processing unit, an input/output device and so on, and performs the processing of data being transferred between other devices and the data memory 3. Included in its functions is writing of an instruction into the instruction memory 2, as required.

Now, let it be assumed that it is determined that the execution of an instruction is completed or will be completed. In this state, (LOAD ADDR. 1) address information based on the contents of the destination field of the completed instruction is put in an address register (not illustrated) for the instruction memory 2. Then, (FETCH INSTR. 2) one instruction is fetched from the instruction memory 2.

If the fetched instruction contains an input field which requires a result from another instruction, (FIELD ACTIVE? 3) the instruction fetch unit 5 checks whether the fetched instruction's input field is active. If the input field is not active, (SET ACTV. MARK 6) an already assigned register number is written into the input field of the instruction specified by the destination field and the fetched instruction is returned to the instruction memory 2.

If the input field is active, a test (FUNCTION BUSY? 4) is performed to determine if the function unit is busy. If the required unit is available, (ASSIGN REG. 10) the register number is assigned and (ISSUE INSTR. 11) the execution of the instruction is started. On the other hand, if a desired operation unit or the like is busy, (INSTR.→ACTV. LIST 5) address information representing the instruction is registered in the active instruction list unit 9 and (SET ACTV. MARK 6) the assigned register number is written into the input field of the instruction in the instruction memory 2 which is specified by the destination field of the fetched instruction.

Next, a test (INSTR. IN LIST? 7) is performed to determine if there is an active instruction on the active list. If another instruction has been registered in the active instruction list unit 9, then (FETCH INSTR. 8) it is fetched from the instruction memory 2 to be executed next. In the event that another instruction has not been registered in the active instruction list unit 9, (NEW INSTR. SEARCH 13) the instruction memory 2 is accessed. For example, there may be a sequential search of the instruction memory 2 for an active instruction. Of course, the active instruction list unit 9 may be dispensed with and, in such a case, an executable instruction is executed after the desired operation unit or the like is released from the busy state, but the speed of parallel execution of instructions is decreased, resulting in impaired performance.

Going back to the description of the steps followed after the function busy test (4), when the desired operator or the like was not busy, and if only the processing mentioned above was performed, the instruction would be left in the executable state. To avoid this, (RESET ACTV. MARK 9) the instruction fetch unit 5 clears the contents of the input field of the fetched instruction and rewrites the instruction into the instruction memory 2 on the assumption that the instruction will be completed.

The register number assigning processor 6 (ASSIGN REG. 10) determines, by hardware processing, the register number to be written into the input field of the instruction specified by the destination field and then (ISSUE INSTR. 11) issues the instruction to the operation unit 7. After the instruction is issued, (DEST. ADDR. REG. 12), the instruction fetch unit 5 puts the contents of the destination field of the fetched instruction in an address register (not illustrated) of the instruction memory 2.

In the operation unit 7 a plurality of instructions usually run in parallel. When an interrupt occurs (INTRPT. GEN.? 14), however, (LD. FIXED ADDR. 16) a fixed address is produced as in the case of the prior art and an interrupt-servicing program which starts with an instruction stored at that address is executed. Upon completion of the interrupt-servicing program, the operation unit 7 puts the operation results in a register predetermined by the register number assigning processor 6. In the above, if a plurality of interrupt conditions are present when setting the address register of the instruction memory 2, then the address of an interrupt-servicing program is chosen through the use of a priority circuit.

Figure 5:
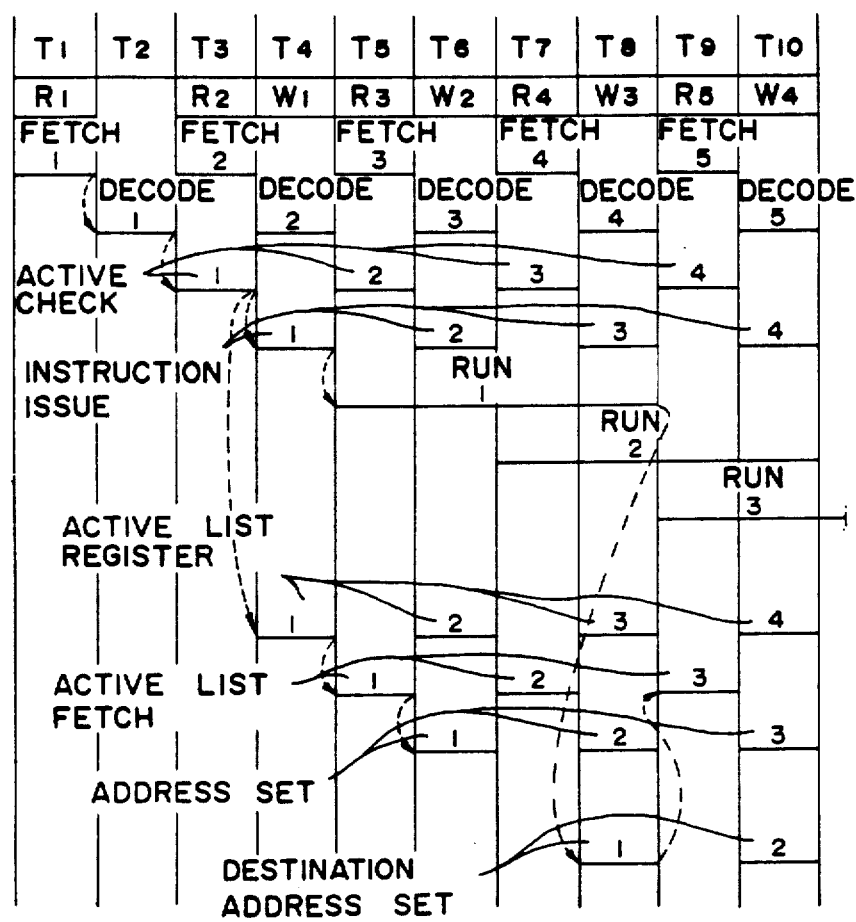
FIG. 5 is a timing chart of the execution of an instruction according to the embodiment illustrated in FIG. 3.

FIG. 5 illustrates an example of a timing chart of the execution of an instruction according to the embodiment of the present invention illustrated in FIG. 3. In time slot $T_1$, an instruction is fetched; in time slot $T_2$, the instruction is decoded; in time slot $T_3$, it is checked whether the instruction is executable, and the register number is assigned; in time slot $T_4$, the instruction is issued to the operation unit 7; in time slots $T_5$ to $T_8$, the operation specified by the instruction is executed; in time slot $T_8$, an address based on the content of the destination field of the instruction is put in the address register of the instruction memory 2; and in time slot $T_9$, the next instruction is fetched which is linked with the instruction executed. If the operation unit is busy in time slot $T_3$, the instruction is registered in the active instruction list unit 9 in time slot $T_4$ and the process of fetching another instruction from the active instruction list unit 9 takes place in time slot $T_5$, and in time slot $T_6$, the address setting of the instruction specified by the destination of the first instruction is performed.

In the case where an executed instruction contains two destination fields, the next instruction is fetched based on the contents of the first destination field. Then, another instruction is fetched based on the contents of the second destination field. The instructions 2 to 5 are processed one after another in a pipeline fashion.

In the present invention, a plurality of operators or function units which may be in the operation unit 7 need not always be synchronized in operation, but the pipelines may also operate in parallel and asynchronously.

The data register can easily be applied to vector processing, too. In that case, a plurality of data (vector data) are all stored in one register and a plurality of the same operations are executed on the data at the same time. Scalar processing which processes a single piece of data can also be simplified by considering it as a special case of handling data in vector processing.

When the register numbers are assigned, they may sometimes exceed the number of registers that the hardware has, causing a deadlock. This can be avoided by a system in which program execution is limited by software to stay within a range of a specified number of registers, or a system in which data is saved by hardware into an additional memory or another register, thereby releasing the data register from the busy state.

Figure 6:
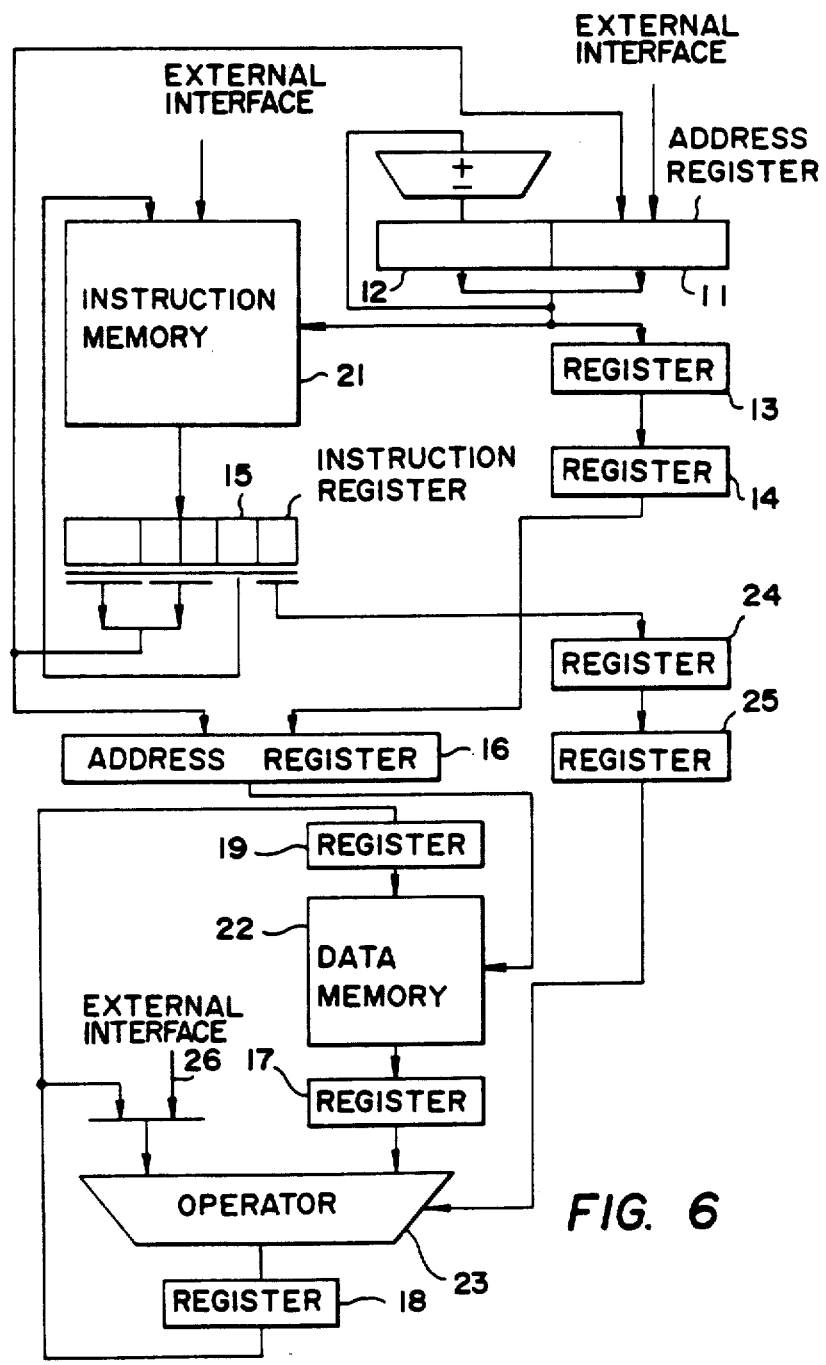
FIG. 6 is a block diagram illustrating the hardware arrangement of another embodiment of the present invention.
Figure 7:
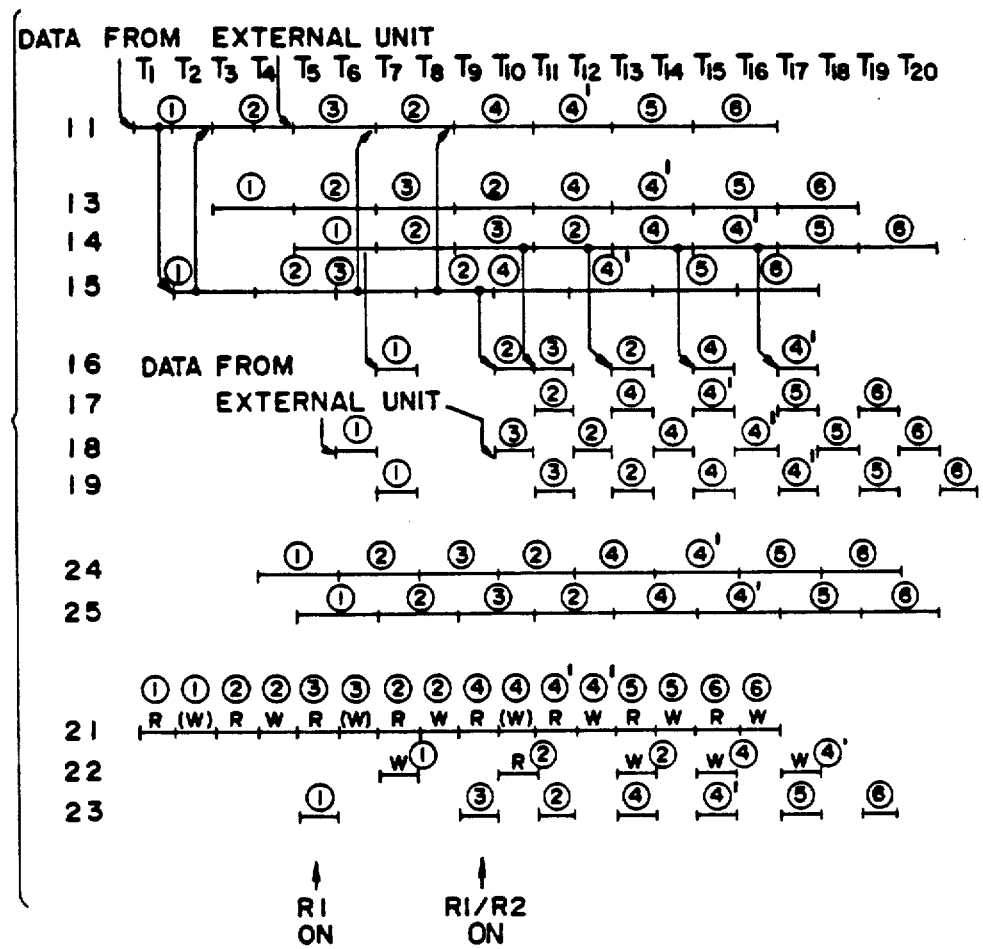
FIG. 7 is a timing chart of the execution of an instruction in the embodiment illustrated in FIG. 6.

FIGS. 6 and 7 illustrate the hardware structure of another embodiment of the present invention and a timing chart of the execution of an instruction in the embodiment, respectively. Circled numerals refer to FIG. 2A and FIG. 7. An instruction group is loaded by an external control circuit into the instruction memory 21 prior to processing. Upon the arrival of external data, an address is put in the address register 11 and instruction ① is read from the instruction memory 21 and written to the instruction register 15. Thereafter, the external data is supplied by the input 26 and provided via the operator 23 and registers 18 and 19 to a data memory 22. The address of the location in data memory 22 is supplied from an address register 16 via registers 13 and 14. Since it is known that the instruction which was written into the instruction register 15 is an external set instruction, instruction ② is read based on the contents of its first input field (that is, the R1 part of instruction ②). When instruction ② is written to the instruction register 15, it cannot be execution because its R2 part is not active. Therefore, the hardware shifts to the processing of instruction ③ as a result of the arrival of external data. The data from the input 26 is provided to register 18. The destination of instruction ③ is the R2 part of instruction ② and instruction ② has already been stored in the instruction register 15. Since its R1 part is active, instruction ② is executable. Next, instruction ② is provided to an operator or function unit 23 via registers 24 and 25. At this time, data corresponding to the R1 part is read from the data memory 22 at the address in the address register 16 based on instruction ② stored in the instruction register 15 and the data thus read is provided to register 17, from which it is applied to the operator or function unit 23 together with the above-mentioned instruction stored in the register 25. Then, instruction ② is executed and the execution result is written into the register 18. The output of the register 18 is provided to the register 19 and, at this time, the destination of instruction ② sent via the registers 13 and 14 is provided via the address register 16 to the data memory 22, by which the result of the execution of instruction ② in the register 19 is written into the data memory 22. Since the destination of instruction ② is in instruction ④, the above-mentioned execution result is written into the data memory 22 at an address corresponding to instruction ④. Instruction ④ is a two-branch instruction and, consequently, data ④ and ④' are subsequently written into the data memory 22 at addresses corresponding to instructions ⑤ and ⑥, respectively. In this case, instructions ②, ④ and ④' are written into the data memory 22 via the following route: the address register 11 to the register 13 to the register 14 to the address register 16. Since the data stored by instruction ④ is the same as the result of the execution of instruction ②, the execution result of instruction ② is held in the registers 18 and 19. Instructions ⑤ and ⑥ are linked with the next instructions and the processing therefor is performed in the same way as mentioned above, hence no description will be given thereof.

In the above, if the numbers of words of the instruction memory and the data memory are selected to be the same, data will not overflow. The addresses of the instruction memory and the data memory will have a one-to-one correspondence. Incidentally, since the data memory is not used in some cases, the number of words in the data memory may be smaller than the number of words in the instruction memory but, in such a case, an address converter or associative storage is needed. In the timing chart of FIG. 7 the execution of an instruction is performed in one cycle; but, if several cycles are required for the execution of an instruction, an instruction fetch must be delayed for several cycles correspondingly.

It will be apparent that many modifications and variations may be effected without departing from the scope of the novel concepts of the present invention.

What is claimed is:

1. An information processing unit which makes a determination whether an instruction is executable on the basis of availability of operand data necessary for executing the instruction and executes the instruction when all operand data is available, the instruction having an operation code field for indicating an operation to be performed, an input field for indicating whether the operand data to be used by the instruction is available, and a destination field for specifying the input field of another instruction which uses a result of the execution as operand data, said information processing unit comprising:
   an instruction memory for storing instructions;
   a data memory for storing the operand data;
   an instruction fetch unit, oeratively connected to said instruction memory, for fetching an instruction from said instruction memory, for determining whether the input field indicates that the operand data to be used by the instruction is available and for providing an indication of data availability to the input field specified by the destination field of the instruction; and
   an operation unit, operatively connected to said data memory and said instruction fetch unit, for receiving the operand data from said data memory, for executing the operation indicated by the operation code field of the fetched instruction and for storing the result of the operation in said data memory.

2. An information processing unit according to claim 1, wherein said operation unit comprises a plurality of operators forming pipelines which are operable asynchronously in parallel.

3. An information processing unit according to claim 1, wherein said operation unit comprises data registers capable of storing data representing a vector, enabling said operation unit to perform vector processing by concurrently executing the same operation on all of the data in one of said data registers.

4. An information processing unit according to claim 3, wherein the execution of a program is limited by software to exceed the number of registers provided by hardware.

5. An information processing unit according to claim 3, wherein when the storage capacity of said data register is exceeded, said operation unit saves the excessive data into said data memory to prevent an overflow of said data register.

6. An information processing unit according to claim 3, further comprising an additional memory, operatively connected to said operation unit, comprising a register for storing data which is sent to said additional memory by said operation unit when said data registers in said operation unit are full.

7. An information processing unit according to claim 1, further comprising a register number assigning processor operatively connected between said instruction fetch unit and said operation unit, said register number assigning processor assigning a register number to the input field of the instruction.

8. An information processing unit for independently storing and processing instructions and operand data, in which each instruction has an operation code field for indicating an operation to be performed, an input field for indicating whether the operand data to be used by that instruction is available and a destination field for specifying the input field of another instruction which uses a result of the execution of that instruction as operand data, said information processing unit comprising:
   external interface means for providing the data and the instructions;
   instruction storage means, operatively connected to said external interface means, for storing the instructions, said instruction storage means initially storing the instructions prior to execution;
   an instruction register, operatively connected to said instruction storage means, receiving one of the instructions from said instruction storage means for determination of operand data availability;
   a first address register, operatively connected to said external interface means and said instruction storage means, receiving a first address from one of said external interface means and said instruction storage means, the first address corresponding to one of the instructions in the instruction storage means;
   data storage means for storing data from said external interface means and the result of the execution of the instructions;
   a second address register, operatively connected to said first address register, said instruction register and said data storage means, for holding a second address from at least one of said instruction register and said first address register, the second address corresponding to data in said data storage means and corresponding to one of the input field and the destination field of one of the instructions; and
   operation means, operatively connected to said external interface means, said instruction register and said data storage means, for passing operand data from said external interface means to said data storage means, for executing the operation indicated by the operation code field in each of the instructions using the operand data stored in said data storage means and for storing the results of the operation in said data storage means at a location determined with reference to the destination field.

9. A method for processing information in a data flow type information processing unit having a data memory, an instruction memory, a register number assigning processor, an operation unit and an interface for external units, comprising the steps of:
   (a) storing instructions and data provided by the interface for external units into the instruction memory and data memory, respectively;
   (b) selecting an instruction from the instructions in the instruction memory;
   (c) determining whether all data required by the instruction is available and whether the operation unit is available;
   (d) assigning a register in the data memory for storing a result of the instruction using the register number assigning processor, if said determining step (c) determined that the data required by the instruction was available and that the operation unit was available;
   (e) saving the instruction for later execution, if said determining step (c) determined that all data required by the first instruction was not available or the operation unit was not available;

(f) processing the instruction in the operation unit, if said assigning step (d) is executed; and (g) repeating said steps (b-f) for successive instructions until processing is completed.

10. A method for processing information in a data flow type information processing unit as set forth in claim 9, wherein each of the instructions includes an input field specifying whether data required by that instruction is available and said assigning step (d) clears the input field prior to assigning the register.

11. A method for processing information in a data flow type information processing unit as set forth in claim 10, said data flow type information processing unit also having an active instruction list unit, wherein said determining step (c) comprises the steps of:

(ci) determining whether the input field of the instruction is active;

(cii) determining if the operation unit is available, if said determining step (ci) determined that the input field of the instruction was active, wherein said saving step (e) comprises the step of storing the instruction's address into the active instruction list unit, if said determining step (ci) determined that the input field was active and said determining step (cii) determined that the operation unit was busy, and wherein said selecting step (b) comprises the steps of:

(bi) determining whether the active instruction list unit is empty;

(bii) selecting the instruction by choosing from among the instructions represented by addresses in the active instruction list unit, if said determining step (bi) determined that the active instruction list unit was not empty; and (biii) selecting the instruction from among the instructions in the instruction memory, if said determining step (bi) determined that the active instruction list unit was empty.

* * * * *